(12) United States Patent
Lack et al.

(10) Patent No.: US 6,264,062 B1
(45) Date of Patent: Jul. 24, 2001

(54) SOLDER PREFORMS WITH PREDISPOSED FLUX FOR PLUMBING APPLICATIONS

(76) Inventors: Craig D. Lack, 438 Greenwood Dr., Wilmington, DE (US) 19808; Peter R. Pratt, 4 Blossom Ct., West Grove, PA (US) 19390

( * ) Notice: Subject to any disclaimer, the term of this patent is extended or adjusted under 35 U.S.C. 154(b) by 0 days.

(21) Appl. No.: 09/328,184

(22) Filed: Jun. 9, 1999

(51) Int. Cl.⁷ ................................................ B65G 59/00
(52) U.S. Cl. ...................... 221/267; 221/279; 221/307; 221/310
(58) Field of Search ................................ 221/267, 279, 221/307, 310

(56) References Cited

U.S. PATENT DOCUMENTS 2,857,794 * 10/1958 Red, Jr. ............................. 221/307 X
4,854,761 * 8/1989 Smith et al. ...................... 221/267 X

OTHER PUBLICATIONS right–tool.com—Why Solder Rings, copyright 1998, 1999.
SoldOmat Rapid Solder Rings by Page Machinery Group.

* cited by examiner

Primary Examiner—David H. Bollinger
(74) Attorney, Agent, or Firm—Robert W. Pitts

(57) ABSTRACT

A solder preform with predisposed flux to be located adjacent to a gap formed between multiple solderable surfaces such that upon heating, the flux wicks into and prepares the solderable surfaces prior to the solder melting and wicking into the freshly prepared gap. In plumbing applications, this invention can be located inside a pipe fitting adjacent to the end of an inserted pipe. Upon heating, this invention will make a sound solder joint by wicking into the annular region formed between the fitting and the pipe. This invention includes a dispenser for solder preforms that has features to align a solder preform with the centerline of the receiving pipe fitting into which it is to be inserted. In addition, the dispenser has features to insure the solder preforms are released one-at-a-time into the receiving fitting.

11 Claims, 13 Drawing Sheets

234
235

236

SOLDER PREFORMS WITH PREDISPOSED FLUX FOR PLUMBING APPLICATIONS

BACKGROUND OF THE INVENTION

This invention relates to shape retaining bodies of solder that are useful for joining two solderable surfaces.

Solder preforms have been used for many years to ease the assembly of solderable surfaces. Some initial approaches used an infusible fixture to hold the solder in place while the joint was made. U.S. Pat. No. 2,055,276 teaches the use of an infusible circular metal channel containing solder to join plumbing pipes and fittings. This infusible channel is required to hold the solder in place while it is reflowed and the joint is formed. Unfortunately, this infusible channel has inherent disadvantages. The lack of conformability of this hard, infusible, metal channel makes aligning the solderable surfaces more difficult. In addition, this infusible channel becomes a permanent but non-load-bearing, part of the joint. This infusible preform also complicates the application of flux, which is necessary to make a good joint.

Flat solder preforms are also used in other applications where the preform can be laid horizontally on the surface to be soldered. In these instances, the reflowing solder simply flows down onto the solderable surface and the joint is made. U.S. Pat. No. 4,020,987 teaches the use of a solder preform for hermetic package sealing. Likewise, U.S. Pat. No. 4,709,849 teaches the use of specific-shaped solder preforms to control the amount and location of solder for the soldering of electronic components. In all these cases, gravity requires that the solderable surfaces be horizontal.

U.S. Pat. No. 1,947,581 teaches an alternate approach to controlling the location of the solder during the flow process. This patent teaches creating channels of specific dimensions in the solderable surfaces. These channels are reported to control the location and amount of solder consumed in the soldering process.

For many years it has been known that flux is required to ensure the solder will bond or alloy adequately to the solderable surfaces. Unfortunately, delivering the correct amount of flux to the correct location such that it can prepare and protect the solderable surface for soldering prior to the solder melting is difficult. For pipe applications, the solderable surfaces are typically coated with flux prior to soldering. The two solderable surfaces are then assembled. Typically, solder in the form of wire or strip is melted near the exposed, outer end of the joint such that capillary forces draw the molten solder into the gap between the two solderable surfaces. This two step process is effective but very slow. In addition, because the operator can not see the inner end of the joint being made, excess or insufficient amounts of both flux and solder are frequently used. Typically, excess molten material flows through the solderable gap and out the opposite end of the joint. If insufficient solder and flux are used, the joint is not sound.

To ensure a good joint between the solderable surfaces, flux should be used. To be effective, the flux must be applied to the solderable surfaces prior to the application or installation of a solder preform. Solder performs are shaped solder structures designed to simplify the solder application step of the conventional soldering process. However, the use of solder preforms does not adequately address the application of flux.

The problem of applying flux to solderable surfaces has been the subject of many development efforts and some more recent patents. One common flux-containing solder preform is a material often called rosin-core solder wire. This preform is in the shape of a hollow wire with the flux contained therein. Unfortunately because this preform is not in the shape of the solderable surfaces to be joined, it provides no means of insuring that the correct amount of solder and flux are delivered to the joint. In plumbing applications, this flux-containing solder wire is typically melted and then pushed into the joint. Because the operator has no way of knowing how much solder to push into the joint, the quality of the resulting joint is often inconsistent. And in many instances, excess solder accumulates inside the pipe in contact with the fluid which passes through.

Several inventions have attempted to incorporate the flux into the solder itself such that the two step (flux then solder) process is reduced to a one step soldering process. U.S. Pat. No. 4,645,545 teaches the use of homogenously mixed solder and flux powders for the construction of solder preforms. However this approach has inherent limitations. First, the flux effectiveness is limited because a significant percentage of the flux may be trapped within the preform and is thus not available to adequately prepare the solderable surfaces until after the surrounding solder matrix has melted; at which time, the solder joint has already been made. In addition, the homogeneous distribution of flux and solder particles throughout the perform results in lower preform strength due to the non-load-bearing nature of the composite. For preforms with at least one small dimension, such as a thin ring for pipe applications, this limitation can render this material too weak to be practical.

SUMMARY OF THE INVENTION

This invention is a nonhomogenous preform consisting essentially of a fusible metal and a surface preparatory material designed to be located adjacent to the gap between two or more solderable surfaces. Upon heating to an appropriate temperature, the surface preparatory material prepares the solderable surfaces and the fusible metal wicks into aforementioned gap to make the joint. The fusible metal could be solder and the surface preparatory material could be a flux. The surface preparatory material can be either at least partially coated on the surface of or contained in recesses in the preform. The recesses for flux containment can either be random or systematically about the preform.

For plumbing applications, the preform could be circular with two substantially parallel sides such as but not limited to a ring or disk shape. Such a circular preform can be inserted into the female pipe fitting prior to insertion of a pipe. With the preform located adjacent to the annular region formed between the pipe and fitting, when heated to an appropriate temperature, the joint is reliably made by the flux and fusible metal wicking through the annular region formed between the pipe and fitting. This nonhomogeneous preform can be designed to deliver the correct amount of flux and solder to the correct location between the solderable surfaces thereby eliminating the flux step of conventional two-step solder processes. Because the precise amount of solder necessary for a good joint can be designed into the preform, this invention also avoids inferior overfilled and underfilled solder joints. In addition, this invention eliminates the drips of hot solder which often occur when too much solder wire is fed into a joint making the joining process inherently safer.

DETAILED DESCRIPTION OF THE INVENTION

Figure 1:
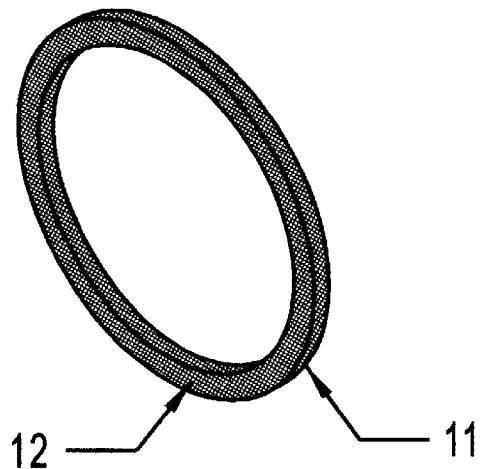
FIG. 1 is a schematic of a solder preform in the shape of a washer which is coated with a thin layer of flux.

This invention is a nonhomogeneous preform of a fusible metal and a surface preparatory material. This preform is designed to be located adjacent to the gap which forms between two or more solderable surfaces. Upon heating to an appropriate temperature, the surfaces are prepared by the activation of the preparatory material and the joint is made by the wicking of the fusible metal into the gap to which the preform had been adjacent. This invention is useful for the purpose of joining two or more solderable surfaces. The fusible metals of this invention include any metal which can flow upon heating and resolidify upon subsequent cooling such as but not limited to soldering and brazing alloys. The surface preparatory material of this invention is any material which is at least partially consumed through reaction with the solderable surfaces such as but not limited to acid and rosin based fluxes. The flux could be applied as a paste, although there are advantages to using a dry powder flux, including prolonging the shelf-life of the solder preforms.

This invention is based on the discovery that this solder preform can be located adjacent to two or more solderable surfaces such that upon melting the solder wicks between the solderable surfaces as a result of capillary forces. Likewise, this invention covers the discovery that flux can be applied adjacent to the two or more solderable surfaces and upon heating be drawn into the gap formed between said solderable surfaces. These discoveries have lead to a useful form of solder and flux preforms. Some forms of this invention eliminate user contact with the flux when installing this preform in the solderable work piece. In other forms, the flux can be contained in the preform in a way that it is directed to the solderable surfaces thereby minimizing the amount which is required. In other forms, the flux can be contained in the pores of a porous, solid solder body provided sufficient channels exist to allow the flux to rapidly flow from the preform to the solderable surfaces prior to the solder being reflowed. Prior art discoveries have focused solely on homogeneous distribution of the flux throughout preformed solder articles which leads to delayed flux delivery from the center of these homogeneous composites and excess flux consumption.

The preformed shaped article of this invention can be used in many applications. In plumbing applications, circular solder preforms can be used to solder the ends of pipes to other fittings. Fittings means any female piece which is designed to slip over the end of a male piece such that a solderable bond can be made via capillary action between the two solderable surfaces. Some examples of fittings include elbows, unions, tees, caps, or valves. In electronics applications, specific shaped solder preforms could be produced for attachment of two or more solderable surfaces such as but not limited to the joining of electronic components to circuit boards and wires to connection pins or pads.

Surface Preparatory Materials

As mentioned above, fluxes are necessary for surface preparation and for protection of the surfaces against oxidation during the soldering process. Many different types of flux can be used in this invention. The selection of flux typically depends on the end application of the solderable surfaces. For plumbing applications, lead-free fluxes and solders are preferred. Alloys containing tin and lead are commonly used for other soldering applications. Depending on the ratio of the alloy elements, various melting temperatures can be achieved. A composition of 63% tin and 37% lead will melt around 361 F. A composition of 60% tin and 40% lead melts more near 370 F. As the percentage of lead increases, the melting point of the solder-alloy increases. Lower melting solders have been developed by the inclusion of a small percentage of other low melting metals. A composition of 62% tin, 35.8% lead, 2% silver, and 0.2% antimony melts around 354 F. High melting solders have also been developed. A composition of 93.5% lead, 5% tin, and 1.5% silver solder alloy melts between 565 F and 574 F.

Forms of the Invention

One form of this invention is a circular ring of solder having a rectangular cross-section as shown in FIG. 1. The solder ring (11) can be coated either partially or completely with flux (12). The simplicity of this form of the invention may be preferred due to ease of manufacture. As a result of the flux being on the external surface, these parts may be messy to handle and are thus best suited for use in some form of dispenser.

Figure 2:
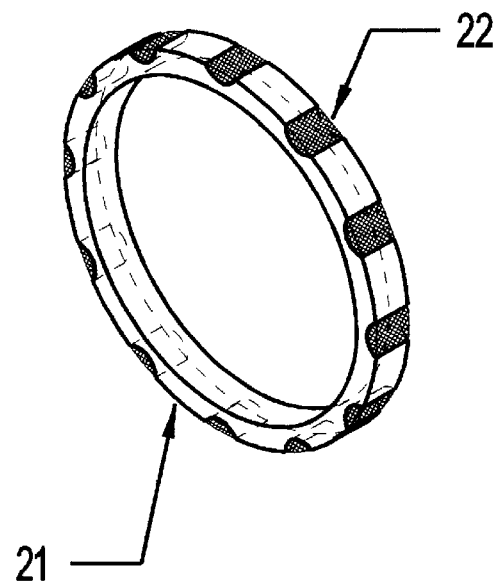
FIG. 2 is a schematic of a solder preform in the shape of a washer in which flux is located on the outside diameter in channels which are oriented parallel to the axis of the solder preform.

If the flux-containing solder preforms are to be handled individually, one may choose to locate the flux (22) in indentations in the solder preform (21) as shown in FIG. 2. This form of this invention allows the flux-containing solder preform to be handled while minimizing the tendency for the flux to be smeared or transferred onto the installer's hands or tools.

Figure 3A:
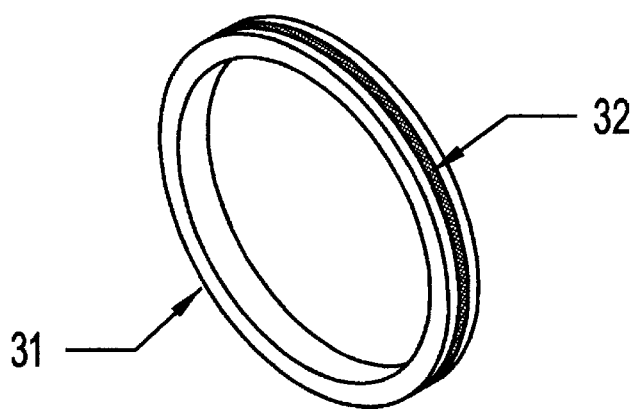
FIG. 3A is a schematic of a solder preform in the shape of a washer in which flux is located on the outside diameter in a circumferential channel which is oriented perpendicular to the axis of the solder preform.
Figure 3B:
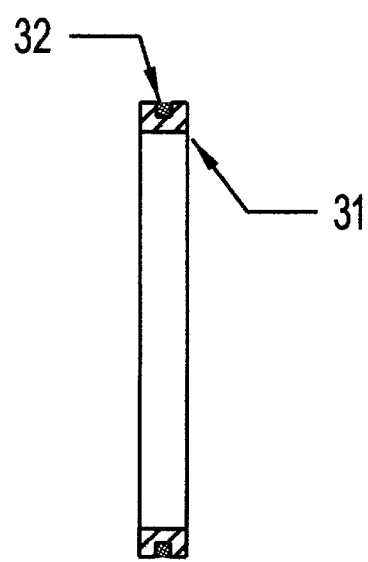
FIG. 3B is a cross-section of the solder preform in FIG. 3A.

An additional form of a clean handling flux-containing solder preform is shown in FIG. 3A. In this instance, the flux (32) is located in a channel, which runs circumferentially around the circular solder preform (31). FIG. 3B shows a cross-section of the solder preform (31) channel in which the flux (32) is contained. This form allows the flux to be distributed uniformly around the circumference of the joint even if the initial flux is not uniformly distributed around the solder preform. With this configuration, the flux will readily flow around the preform via the channel and thereby provide for even application to the surfaces of the solderable surfaces.

Figure 4A:
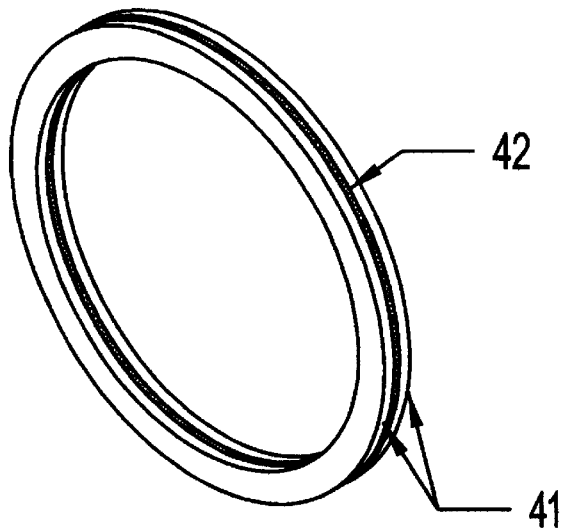
FIG. 4A is a schematic of a solder preform in the shape of a washer in which flux is sandwiched between the top and bottom halves of the washer-shaped solder preform.
Figure 4B:
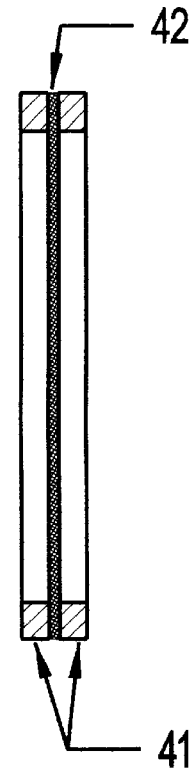
FIG. 4B is a cross-section of the solder preform in FIG. 4A.

A similar form is shown in FIG. 4A where the flux (42) is located between two separate solder preforms (41). The cross-section of this configuration is shown in FIG. 4B. This configuration provides the advantages described for the configuration shown in FIGS. 3A and 3B but with the additional advantage of being able to deliver the flux to the inside diameter of the solder preform prior to the solder melting. This form would be useful if the solder preform was to be sized to slide over the outside diameter of one of the solderable surfaces.

Figure 5A:
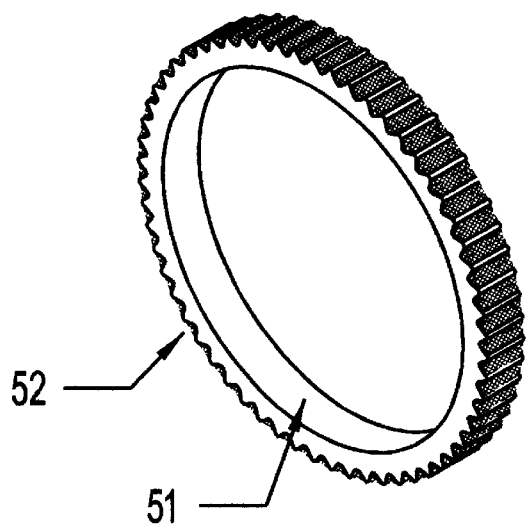
FIG. 5A is a schematic of a solder preform in the shape of a washer in which flux is located on the outside diameter in serrated channels which are oriented parallel to the axis of the solder preform. In this case, the serrations make the assembly more consistent because the tips of the serrations will deform to accommodate small variations in the mating part.
Figure 5B:
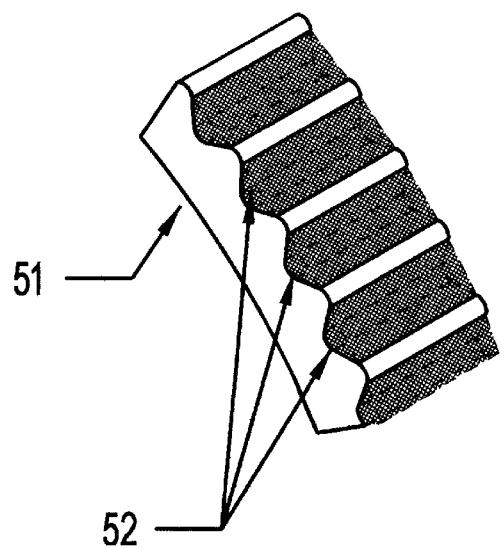
FIG. 5B is a cross-section of the solder preform in FIG. 5A.

In order to account for variability in pipe and fitting diameters, an alternate configuration of this invention is possible as shown in FIG. 5A and FIG. 5B. The solder preform (51) could have protrusions off the surface. The shape of these protrusions could be designed to allow the solder preform to fit snuggly into fittings with varying inside diameters. And as with the previous configurations, the flux (52) could be contained in the recesses, which are formed between protrusions. This form of the invention allows for clean handlability as well as secure positioning in the desired location prior to the solder being reflowed.

Figure 6:
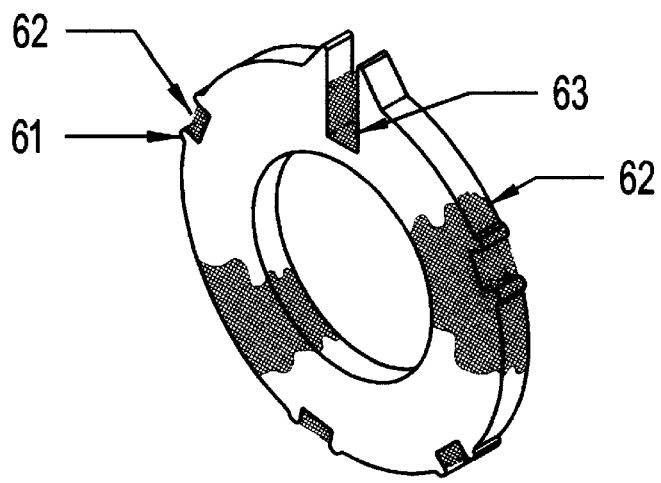
FIG. 6 is a schematic of a washer-shaped, solder preform in which irregular recesses and protrusions are provided and where the surface is at least partially coated with flux.

FIG. 6 shows a washer-shaped, solder preform in which irregular recesses (63) and protrusions (61) are provided and where the surface is at least partially coated with flux (62). The flux does not need to uniformly fill the provided recesses (63) provided sufficient flux is available to prepare the solder surfaces upon heating. These recesses and protrusions can also serve to guide the solder preform down the barrel of a preform dispensing tool. The protrusions can also compensate for variations in the dimensions of the pieces that are to be soldered. It may also be advantageous to have these recess and protrusion features arranged in a regular pattern around the solder preform.

The fact that irregularities and asymmetries in the solder-preform itself as well as with respect to the level of flux does not prevent this invention from achieving the desired results has many positive implications. One advantage is that these asymmetrical features can accommodate the tolerances in the dimensions of the solderable surfaces. Thus, the solder preform parts are easier to manufacture than would have been the case if tighter tolerances and flux loading levels were required.

Figure 7:
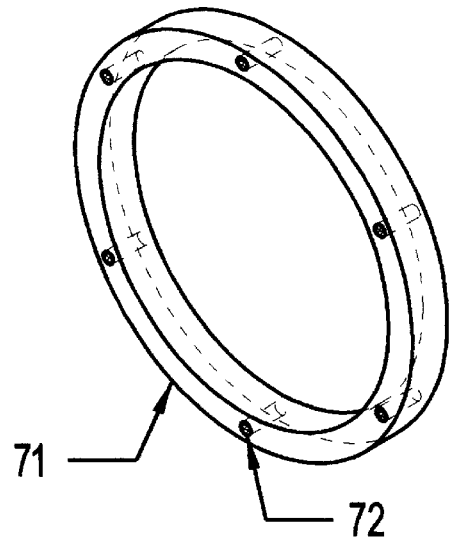
FIG. 7 is a schematic of a solder preform in the shape of a washer in which flux is located within the wall of the preform in circular holes, which are, oriented parallel to the axis of the preform.

Another easily manufactured form of this invention is shown in FIG. 7. The flux (72) is contained in longitudinal channels in the solder preform (71) which run parallel to the axis of the fitting into which the preform is to be inserted. This configuration provides the added advantage that the entire outside diameter of the preform can be handled cleanly and without disturbing the flux.

Figure 8A:
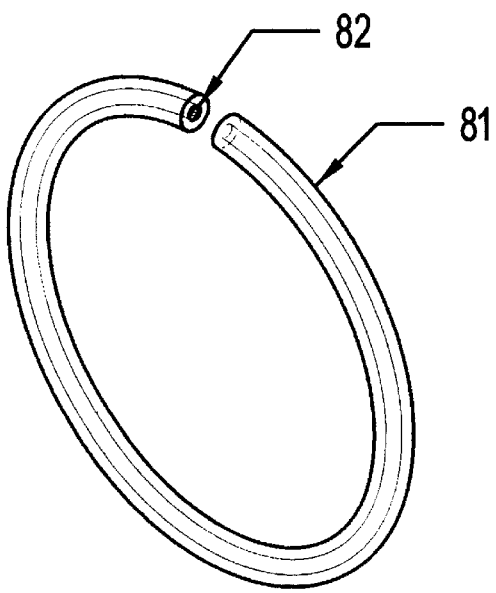
FIG. 8A is a schematic of a solder preform in the shape of a split washer.

To aid in holding the solder preform in place prior to solder reflow, a split ring configuration can be used as shown in FIG. 8A. The split ring can be designed to have a slightly larger outside diameter than the inside diameter of the fitting into which it is to be inserted. Compression of the preform will then allow it to fit snuggly into the fitting. Likewise in applications where the solder preform is to fit over a pipe, the inside diameter of the split ring could be made slightly smaller than the outside diameter of the pipe over which it is to fit. The split ring solder preform can have a range of cross-sectional shapes such as rectangular and trapezoidal. Flux can be contained on or in the split ring preform via any of the configurations discussed previously.

Figure 8B:
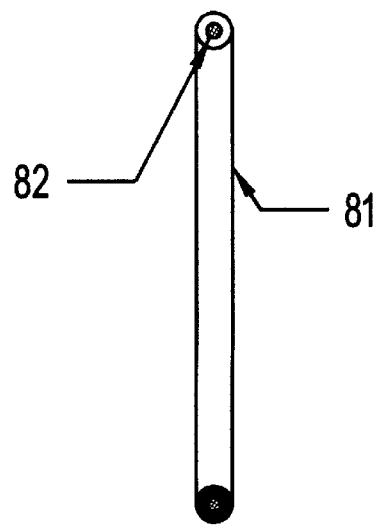
FIG. 8B is a cross-section of the solder preform in FIG. 8A where the preform has a circular cross-section containing flux.

The split ring configuration of this invention provides the additional advantage of enabling the use of flux-cored solder where the flux (82) is contained in a hollow sheath of solder (81) as shown in FIG. 8B. The flux (82) in this instance is free to flow from the inside of the solder (81) prior to the solder being melted. Thereby, the surfaces can be prepared before the solder melts and begins to make the joint.

Figure 9A:
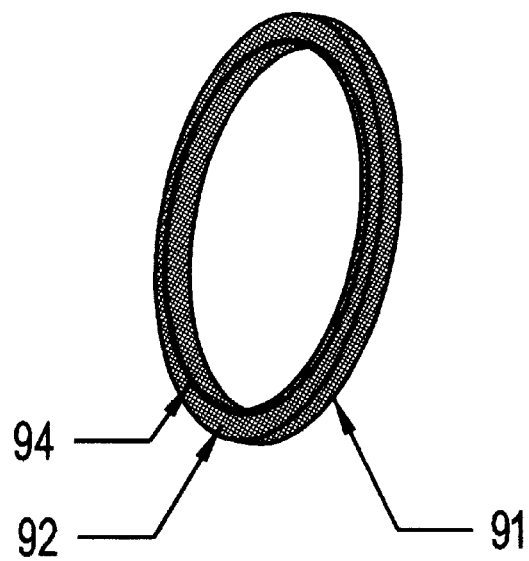
FIG. 9A is a schematic of a solder preform in the shape of a washer with a taper on the inside diameter. The preform is coated with a thin layer of flux.
Figure 9B:
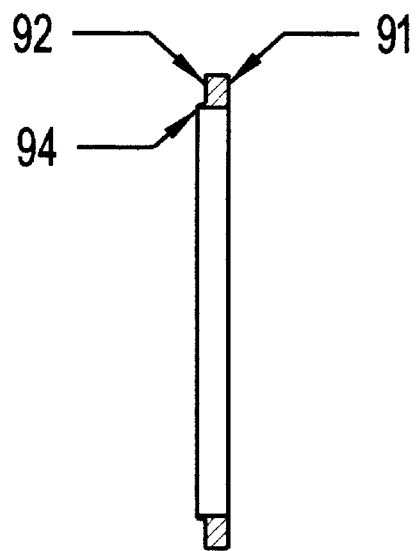
FIG. 9B is a cross-section of FIG. 9A.
Figure 9C:
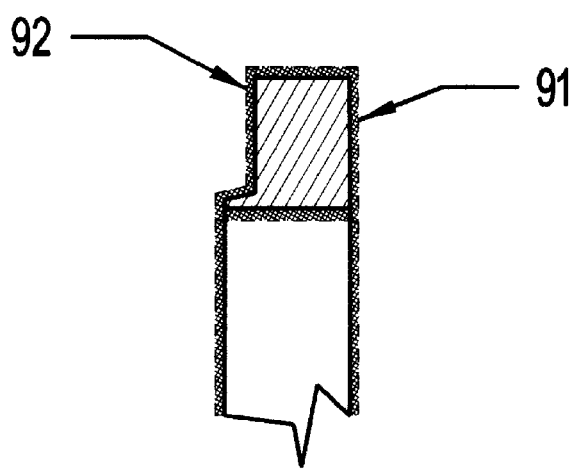
FIG. 9C is an enlarged view of the tapered edge in FIG. 9B.

An alternate means of holding the solder preform in place prior to the solder being reflowed is shown in FIG. 9A where a lip (94) exists on the circular solder preform (91). A cross section of this configuration is shown in FIG. 9B. An enlarged view of this cross section is shown in FIG. 9C. The angle of the taper on the preform can be designed to allow the preform to fit securely on the male end of a pipe. The pipe with the solder preform attached to one end can then easily be inserted into a female fitting. This configuration is ideal for projects where the male pipe needs to be pushed vertically or at some angle into a female fitting. The flux can optionally be incorporated into this configuration via any of the previously discussed means. A coating of flux (92) is shown in FIG. 9A.

Figure 10:
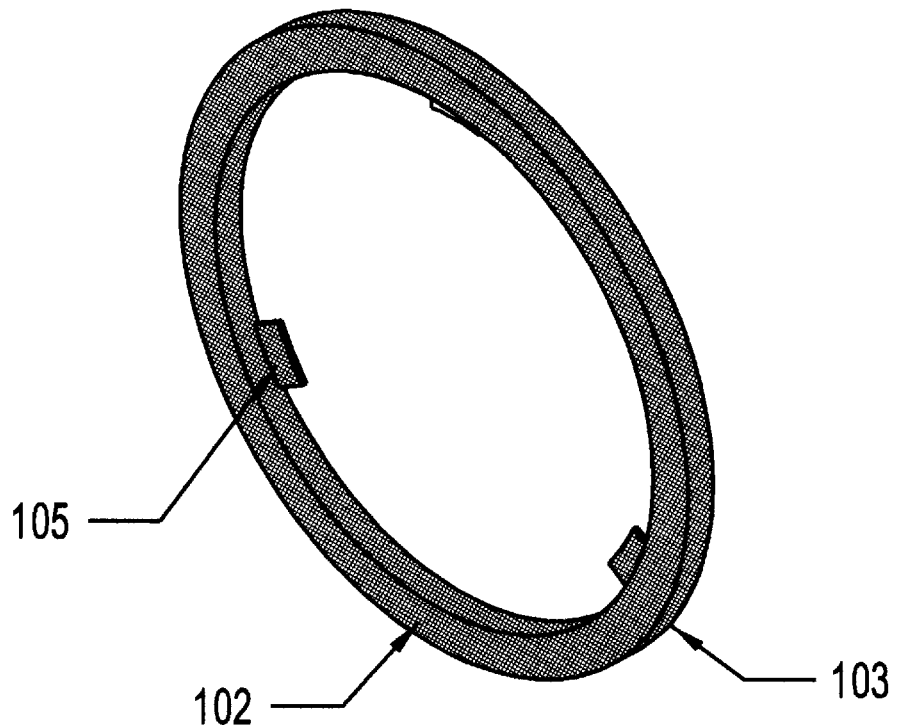
FIG. 10 is a schematic of a solder preform in the shape of a washer with tabs located on the inside diameter. The preform is coated with a thin layer of flux.

Yet another means of holding the solder preform in place prior to the solder being reflowed is shown in FIG. 10 where a tabs (105) exists on the circular solder preform (103). These tabs can be designed to be bent over the male end of a pipe thereby holding the solder preform in place. This configuration is ideal for projects where the male pipe needs to be pushed vertically or at some angle into a female fitting. The flux can optionally be incorporated into this configuration via any of the previously discussed means. A coating of flux (102) is shown in FIG. 10.

Figure 11:
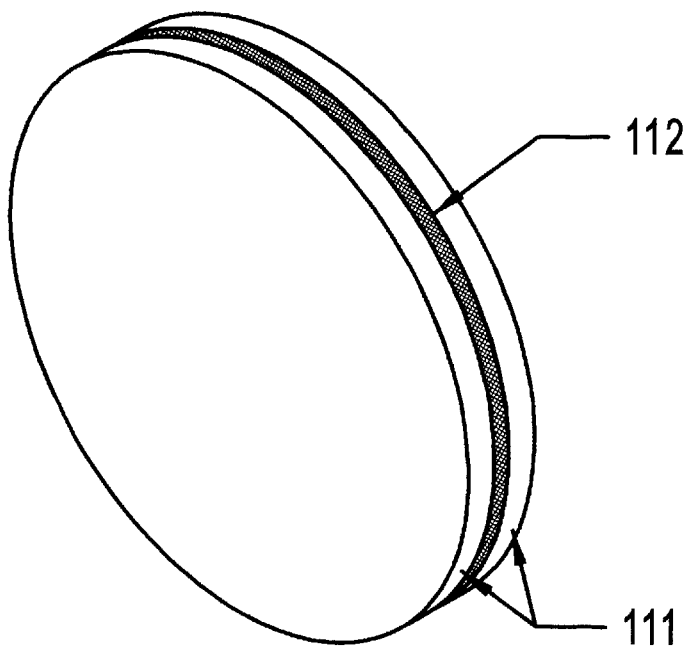
FIG. 11 is a schematic of a solder preform in the shape of a disk in which flux is located on the outside diameter in a circumferential groove that is oriented perpendicular to the axis of the solder preform.

The attachment of end caps on plumbing pipes is a common problem because the inside of the fitting is invisible to the installer. Thus, a disk-shaped solder preform (111) configuration of this invention can be used, as shown in FIG. 11. The flux in this configuration can be contained in any number of ways. FIG. 11 shows the flux (112) being contained in a circumferential channel similar to that shown in FIG. 3.

Uses of the Invention

Figure 12:
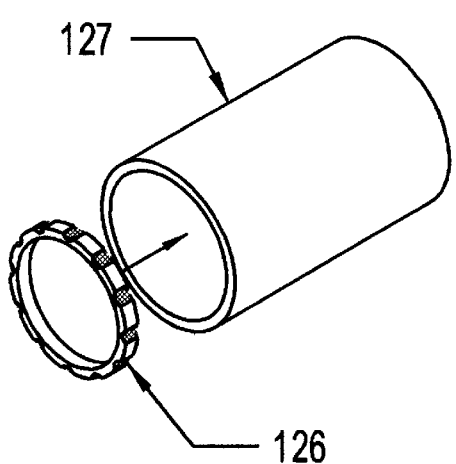
FIG. 12 is a schematic of a solder preform being inserted into a pipe fitting.
Figure 13:
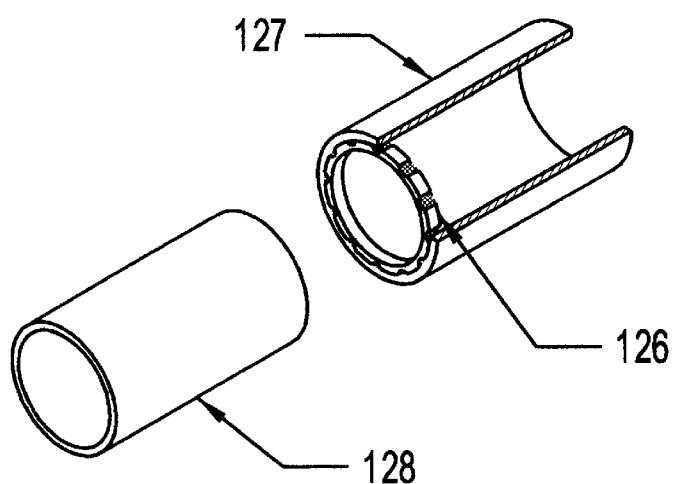
FIG. 13 is a schematic of a solder preform being pushed into a pipe fitting with a mating piece of pipe.
Figure 14:
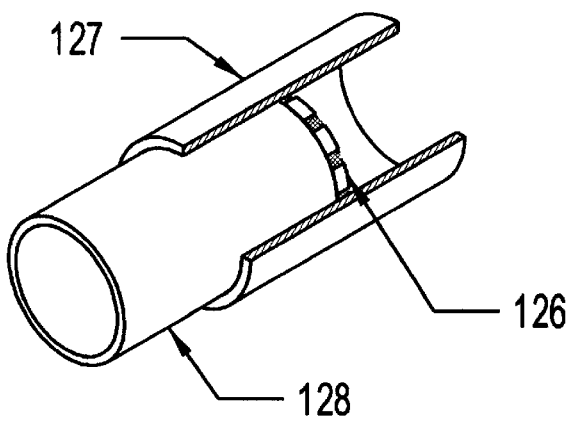
FIG. 14 is a schematic of the assembled pipe, solder preform, and fitting joint in which the solder preform is located adjacent to the annular region.

One of the main applications of this invention is the joining of pipes and fittings in plumbing applications. While not required, it is preferred that the outer surface of this invention has straight walls which form parallel surfaces when inserted into the pipe fitting. This flat exterior surface along with the correct clearances insure that the solder preform will slide squarely into the pipe fitting discussed above without becoming cocked. FIG. 12 shows how a flux-containing, ring-shaped, solder preform (126) can be inserted into a female pipe fitting (127). This preform (126) can then be pushed into the fitting (127) by the male end of the pipe (128) as shown in FIG. 13. The resulting assembled joint prior to heat being applied is shown in FIG. 14.

Figure 15:
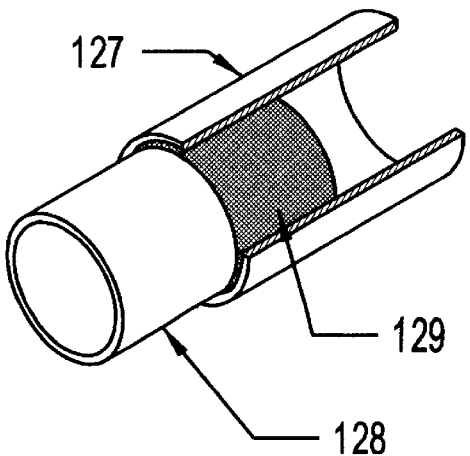
FIG. 15 is a schematic of a completed solder joint after heat was used to activate the flux and reflow the solder into the annular region of the joint depicted in FIG. 14.

As heat is applied to the assembled joint, the flux will melt first and begin preparing the solderable surfaces. Shortly after the flux has melted, the solder itself will melt and be wicked via capillary action into the gap which is formed between the two or more solderable surfaces. In the pipe joining case, the annular region formed between the female fitting (127) and the male pipe (128) would be filled with reflowed solder (129) as shown in FIG. 15.

In contrast to this clean and efficient, one-step pipe joining operation conventional soldering methods require at least two steps and frequently result in an inferior joint. In conventional soldering, the flux first has to be applied to either the pipe (128) or the fitting (127) and the two parts assembled. Then, heat has to be applied while concurrently feeding solder into the exterior end of the annular region formed between the fitting and the pipe. Amongst its other problems, this conventional method requires a high degree of coordination. In addition, because one can not be sure how much solder to feed into the joint, this conventional methods frequently results in either too much or insufficient solder being used. Insufficient solder can result in poor joint quality and reliability. Excess solder is a hazard while the joint is being formed. Once the annular region is full, any excess solder fed into the joint will drip from the end of the fitting. These drips of molten solder are a serious safety hazard especially when solder joints are being made overhead. The joint forming process enabled by this invention virtually eliminates both of these very common pipe soldering problems.

Attachment of an end-cap to a pipe typically requires more solder than hollow pipe and fitting joints. As part of this invention, it was discovered that a solid-disk shaped solder preform could be used to consistently provide the correct volume of solder necessary to end-cap joints. Alternatively, an oversized ring-shaped solder preform can also be used for applications requiring higher solder volumes.

Figure 16:
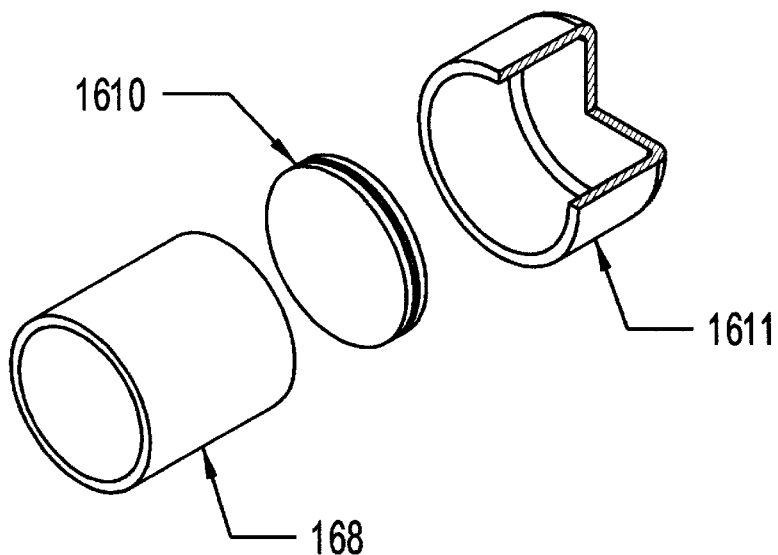
FIG. 16 is a schematic of a pipe, a disk-shaped solder preform, and an end-cap prior to assembly.
Figure 17:
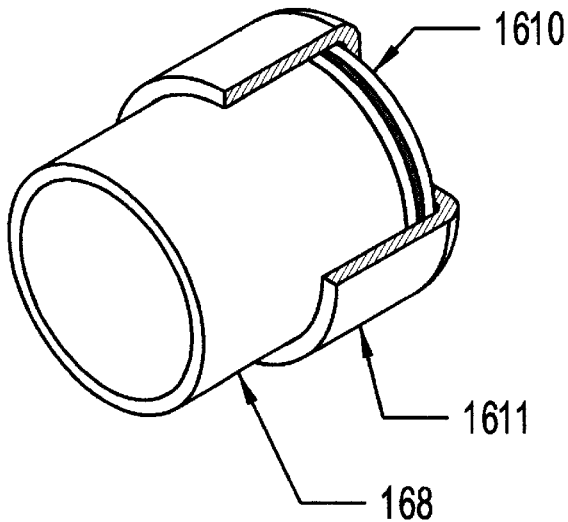
FIG. 17 is a schematic of an assembled pipe and end-cap with the solder preform located between the pipe end and the end-cap.
Figure 18:
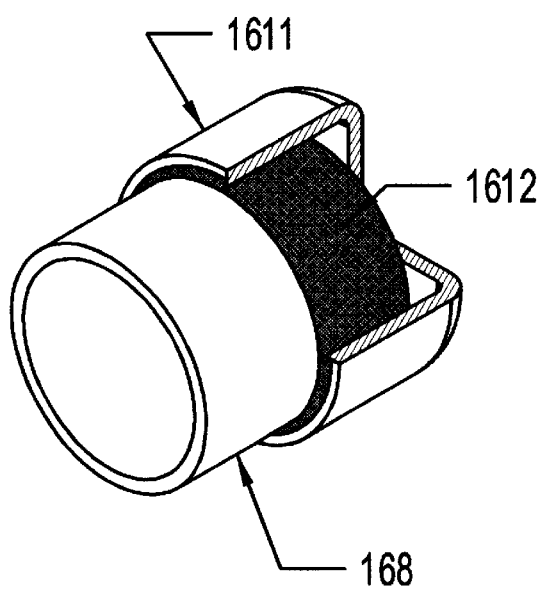
FIG. 18 is a completed end-cap joint after heat was used to activate the flux and reflow the solder into the annular region between the pipe and end-cap.

A disk-shaped solder perform (1610) can be used to join end-caps (1611) to plumbing pipes (168) as shown in FIG. 16. The assembled, capped pipe is shown in FIG. 17 prior to the flux being activated and the solder reflowed. FIG. 18 shows a completed end-cap to pipe joint where the reflowed solder (1612) predominantly is located in the annular region formed between the end-cap (1611) and the pipe (168). Because this joining process involves fewer steps and greater control of solder volume, this use of this invention awards similar advantages as discussed above for pipe and fitting applications.

Manufacture of this Invention

This invention can be made by a number of processes including but not limited to forward extrusion, reverse extrusion, stamping, pressure forming, and cold rolling. Extrusion processes enable long lengths of the desired diameter solder tube to be made in either batches or semi-continuously or continuously. Slices can then be cut from these solder tubes to produce a ring of the desired thickness. By changing tooling, the desired recesses and protrusions such as those shown in FIGS. 2,5,6, and 7 can be imparted as part of the resulting solder tube. Alternatively, recesses and protrusions can be added to the solder tube after it is formed. The latter approach is generally preferred because it eliminates an additional forming process step.

Some forms of this invention can be made by co-extrusion of solder and flux. The resulting solder and flux composite tube would then only need to be sliced to the desired thickness.

A Dispenser for Solder Preforms

Figure 19A:
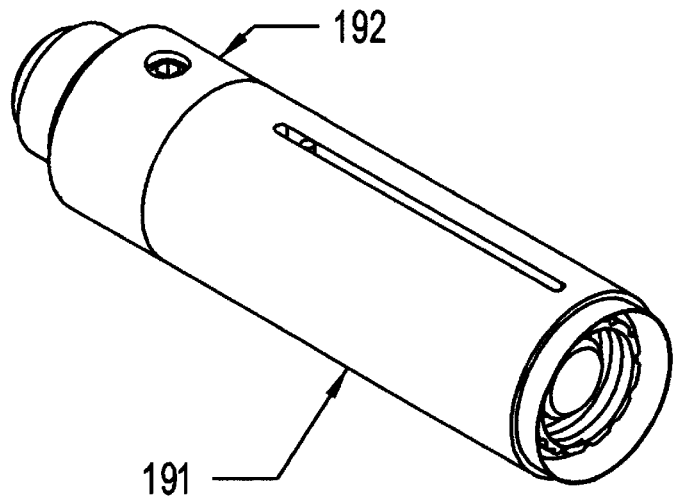
FIGS. 19A, 19B, and 19C are schematics of a dispenser showing some geometric features that make it useful for dispensing solder preforms into pipe fittings.
Figure 19B:
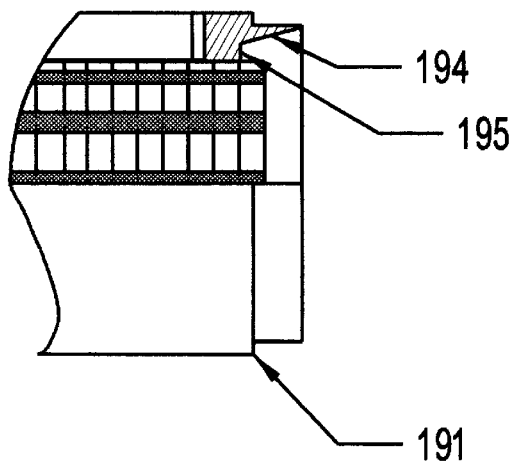

A dispenser can be used as a means of handling of these solder preforms. While many types of dispensers are possible, a tubular one is best suited for essentially round solder preforms. FIG. 19A shows a tubular solder preform dispenser (191), including a cylindrical magazine for storing stacked preforms, that includes a rotate-able knob (192) at one end. This knob serves as a means of advancing the solder preforms through the dispenser. Other means of advancing the solder preforms through the dispenser can also be used including but not limited to a ratchet or a piston. The solder preforms are press fit in the cylindrical magazine at least at the open end of the magazine through which preforms are dispensed one at a time. In this way the preforms are held in the magazine. Typically the solder preforms would be loaded into the opposite or rear end of the magazine where there would be a loose fit. A unique feature of this dispenser is the shape of the lip shown in FIG. 19B. A taper (194) should be provided on the inside diameter to assist in center alignment of the receiving pipe fitting in the dispenser. In order to limit the insertion distance of the receiving pipe fitting into the dispenser, a second reduction in the lip inside diameter such as a step (195) is recommended but not required.

Figure 19C:
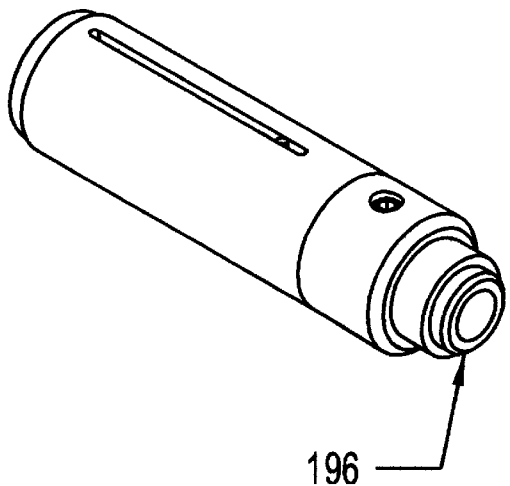

The movement of the solder preform in the pipe fitting can be accomplished by the male pipe being pressed into the female pipe fitting which contains the solder preform. Alternatively, a specially designed tool can be used. Part of this invention is a solder preform dispenser (FIG. 19C) which has an appropriately sized protrusion (196) capable of pressing a solder preform into a pipe fitting. The specific dimensions of this protrusion are chosen to ensure that the solder preform moves squarely into the pipe fitting.

Figure 20A:
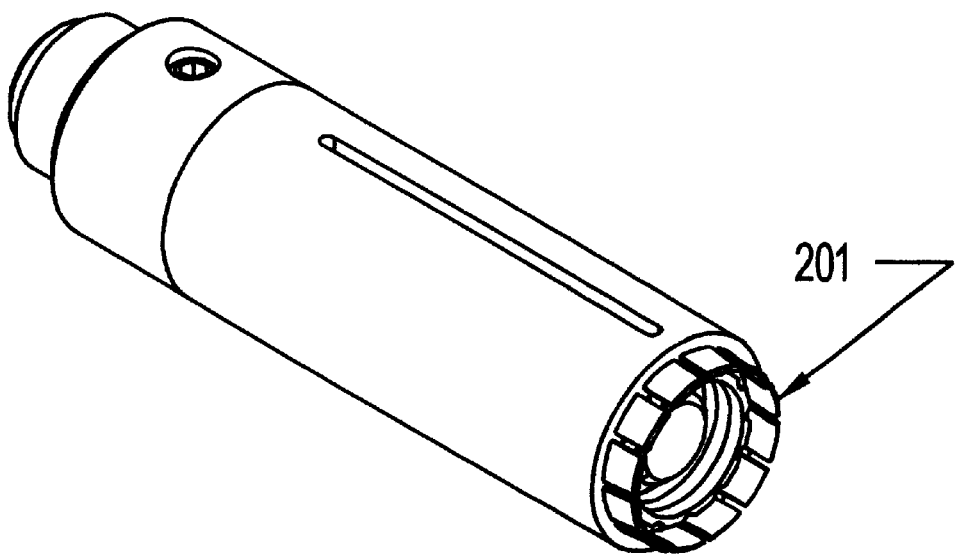
FIGS. 20A and 20B are schematics of a solder preform dispenser showing flexible tabs which can be used to guide a pipe fitting onto a solder preform contained therein.
Figure 20B:
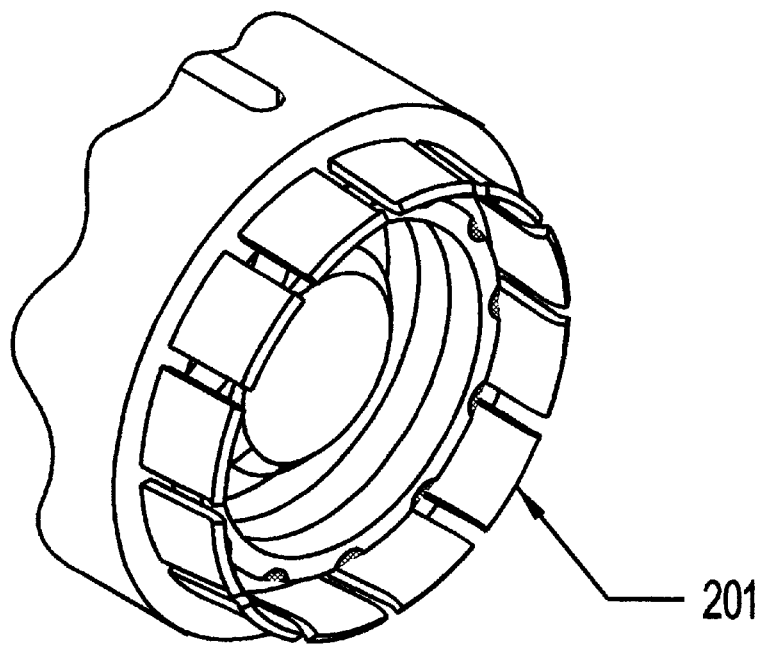

An alternate approach to the solder preform dispenser is shown in FIG. 20A. In this case, the pipe fitting can be guided onto the solder preform by an arrangement of flexible tabs (201) located around the perimeter of the entrance of the dispenser. These flexible tabs help align the female pipe fitting with the solder preforms during the initial insertion process. Other means of ensuring the square insertion of a pipe fitting onto the solder preform can also be used.

EXPERIMENTAL MEASUREMENTS

The completeness of the joints produced using the solder preforms of this invention was tested in several ways. Visual inspections were conducted to determine if the solder had formed a complete, annular ring around the pipe. These observations were made by looking at the joint where the end of the fitting overlaps the pipe. Waterproofness was tested using hydrostatic pressure. By connecting the solder pipe and fitting to appropriate unions, the soldered article could be filled with water prior to pressurization thereby insuring that no air was trapped. The mechanical strength of the joint was tested by simple mechanical test methods.

Examples 1 through 5 depict various embodiments of this invention. It should be understood, however, that the invention is not limited to the precise arrangements, constructions, nor orientations shown in these examples.

EXAMPLE 1

A preferred embodiment of this invention is thin, flat, solder ring (21) which contains recesses that are at least partially filled with flux (22) as shown in FIG. 2. Flux for this embodiment can be purchased from McMaster-Carr Supply Company in New Brunswick, N.J.

Figure 21:
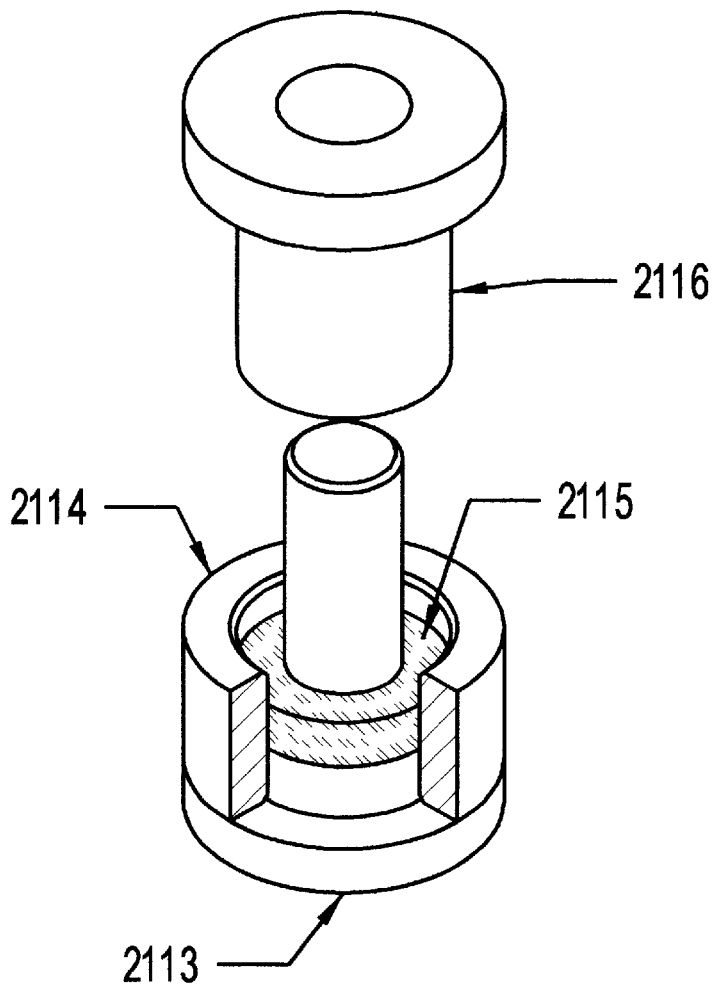
FIG. 21 is a schematic of the tooling to reverse extrude the solder tube used to produce the ring-shaped solder preforms prior to the reverse extrusion process.
Figure 22:
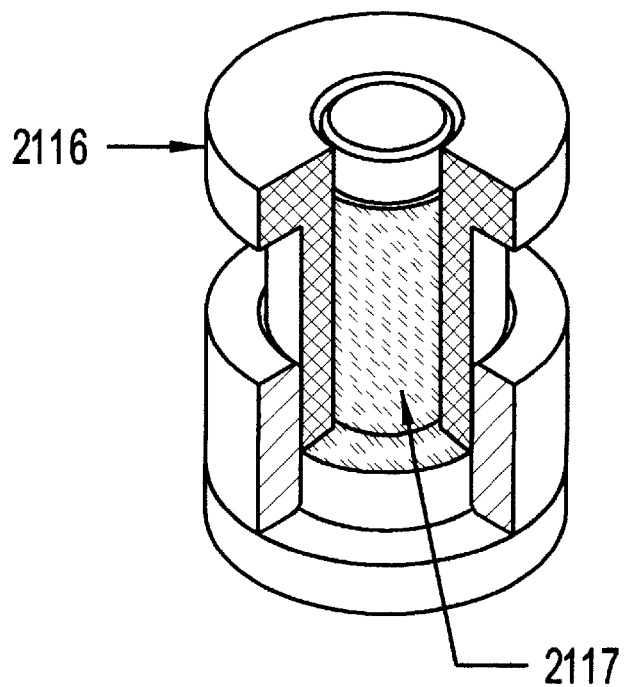
FIG. 22 is a schematic of the reverse extrusion tooling after the solder was softened and extruded into the cylindrical, annular region of the tooling.

The solder preform of the examples cited herein were prepared using reverse extrusion. The examples of described herein were prepared the reverse extrusion tooling shown in FIG. 21. An aluminum base with a perpendicular mandrel (2113) was made having an outside diameter close to the desired solder preform inside diameter. Then, an outer ring (2114) of aluminum was made from second aluminum block. This cavity was then partially filled with a measured volume of solder (2115) of lead-free solder (part no. 91491, available from Taracorp. Inc., Atlanta, Ga.). This tooling and solder was heated until the solder began to soften. When the solder was sufficiently soft, the mold collar (2116) was pressed down over the center mandrel thereby uniformly forcing the softened solder to uniformly extruded itself into the annular region which was formed between the mandrel outside diameter and the mold collar inside diameter as shown in FIG. 22. The tooling and solder were cooled and subsequently disassembled. A uniform tube of solder (2217) resulted as shown in-situ in FIG. 22. After cooling, the resulting tube-shaped solder preform (2117) was then removed.

The mold collar (2116) was sized such that annular region formed between the mandrel outside diameter and the collar inside diameter produced that desired solder perform dimensions. In many of the examples, the mold collar had dimensions appropriate to produce a solder washer suitable for fitting into a half inch standard domestic plumbing fitting.

An independent, slightly undersized mandrel was then inserted into this tube-shaped solder preform. Channels were then formed in the outer solder surface by scribing lines with a sharp tool in a direction parallel to the longitudinal direction of the mandrel. At least some of these channels were then at least partially filled with the desired flux. In this example, rosin flux obtainable from McMaster-Carr Supply Company, New Brunswick, N.J. was used. The flux was applied into the channels with a brush and the excess material wiped off using a clean cloth so that the outer solder surface was clean to touch with the exception of the flux-filled channels. The final step in preparing this embodiment of a solder preform was to cut this tubular solder preform into lengths of approximately 0.065 inches using a sharp parting tool. Each flux-containing, ring-shaped, solder preform could then be slipped off the mandrel.

Evaluation of the performance of this embodiment was achieved by using the preform to make numerous solder-joints between oxidized copper pipes and fittings followed by hydrostatic pressure testing. Each trial joint was made by rubbing excess dirt and debris off the end of the copper pipe that was to be soldered using standard plumbing pipe and fitting preparation tools. A solder ring (126) was then placed into the female portion of the fitting (127) as depicted in FIG. 12. The pipe (128) was then inserted as shown in FIG. 13. The pipe (128) was then pushed into fitting (127) until its movement stopped. The insertion of the pipe effectively pushed the solder-ring (126) into position in the interior of the fitting so that the flux was near or contacting the surface(s) to be soldered shown in FIG. 14. Heat was then applied to the outside of the fitting and adjacent pipe using a propane torch. The heat first activated the flux such that the solderable surfaces in the annular region were cleaned and protected from oxidation. Soon after, the solder melted. Molten solder (129) was then drawn into the annular region by capillary and other surface forces as depicted in FIG. 15. As soon as a ring of shinny solder appeared in the outer annular area between the fitting (127) and the pipe (128), the heat was removed and the joint allowed to cool. After cooling this soldered piece was connected to a water supply and tested for leakage. Care was taken to insure that all air was removed from the piece during hydrostatic testing.

EXAMPLE 2

This embodiment of this invention is a solder preform in the shape of a thin, flat, ring (11) which was at least partially coated with flux (12) as shown in FIG. 1. Solder and flux for this embodiment can be purchased from McMaster-Carr Supply Company in New Brunswick, N.J.

This embodiment was made by the same reverse extrusion technique described in Example 1. In this example, no recesses were cut into the extruded tube prior to being sliced into thin rings. Each ring-shaped solder preform was subsequently at least partially coated with flux prior to use.

Evaluation of the performance of this embodiment was achieved by using the preform to make numerous solder joints between oxidized copper pipes and fittings followed by hydrostatic pressure testing. Each trial joint was made by rubbing excess dirt and debris off the end of the copper pipe that was to be soldered using standard plumbing pipe and fitting preparation tools. The joint assembly followed the method described in Example 1. After the formed joint cooled, the soldered piece was connected to a water supply and tested for leakage. Care was taken to insure that all air was removed from the piece during hydrostatic testing.

EXAMPLE 3

This embodiment of this invention is thin, flat, solder ring (21) which contains recesses that are at least partially filled with flux (22) as shown in FIG. 2. However, in this case, no mechanical surface preparation was used prior to joint formation. The pre-fluxed solder preform was responsible for the total joint preparation and formation.

This embodiment was made by the same reverse extrusion, groove cutting, and fluxing techniques described in Example 1. The recesses of each ring-shaped solder preform were at least partially filled with flux prior to use.

Evaluation of the performance of this embodiment was achieved by using the preform to make numerous solder joints between oxidized copper pipes and fittings followed by hydrostatic pressure testing. In this example, each trial joint was made without using standard plumbing pipe and fitting preparation methods. Instead, the oxidized pipes and fittings were only wiped clean of visible dirt with a clean cloth prior to joint assembly. The joint assembly followed the method described in Example 1. After the formed joint cooled, the soldered piece was connected to a water supply and tested for leakage. Care was taken to insure that all air was removed from the piece during hydrostatic testing.

EXAMPLE 4

This embodiment of this invention is a solder preform in the shape of a thin, flat, disk (111) between which flux (112) was sandwiched as shown in FIG. 11. Solder and flux for this embodiment can be purchased from McMaster-Carr Supply Company in New Brunswick, N.J.

This embodiment was made by a similar reverse extrusion technique described in Examples 1 and 2 except in this case no center mandrel was used. Also, as in Example 2, no recesses were cut into the extruded tube prior to being sliced into thin rings. The sandwich configuration was formed by coating one side of one solder disk with flux and then pressing a second solder disk onto the fluxed side of the first disk.

Evaluation of the performance of this embodiment was achieved by using the preform to make numerous solder joints between oxidized copper pipes and end-caps as depicted in FIGS. 16 through 18. Each trial joint was made by rubbing excess dirt and debris off the end of the copper pipe that was to be soldered using standard plumbing pipe and fitting preparation tools. The joint assembly followed a method similar to that described in Example 1. After the formed joint cooled, the soldered piece was connected to a water supply and tested for leakage. Care was taken to insure that all air was removed from the piece during hydrostatic testing.

EXAMPLE 5

This embodiment of this invention demonstrates the use of a solder preform dispenser. The solder preforms used in this example were thin, flat, solder rings (1) which contains recesses that are at least partially filled with flux (2) as shown in FIG. 2 and described above.

Figure 23A:
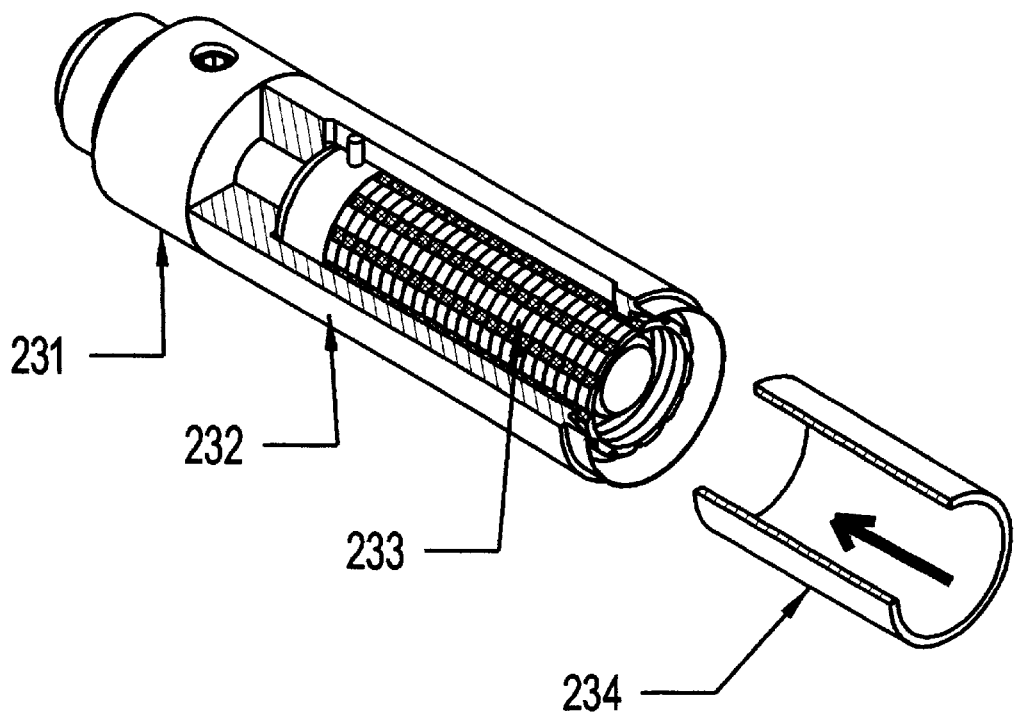
FIG. 23 is a schematic depicting a means of using a solder preform dispenser to insert a solder preform into a pipe fitting.
Figure 23B:
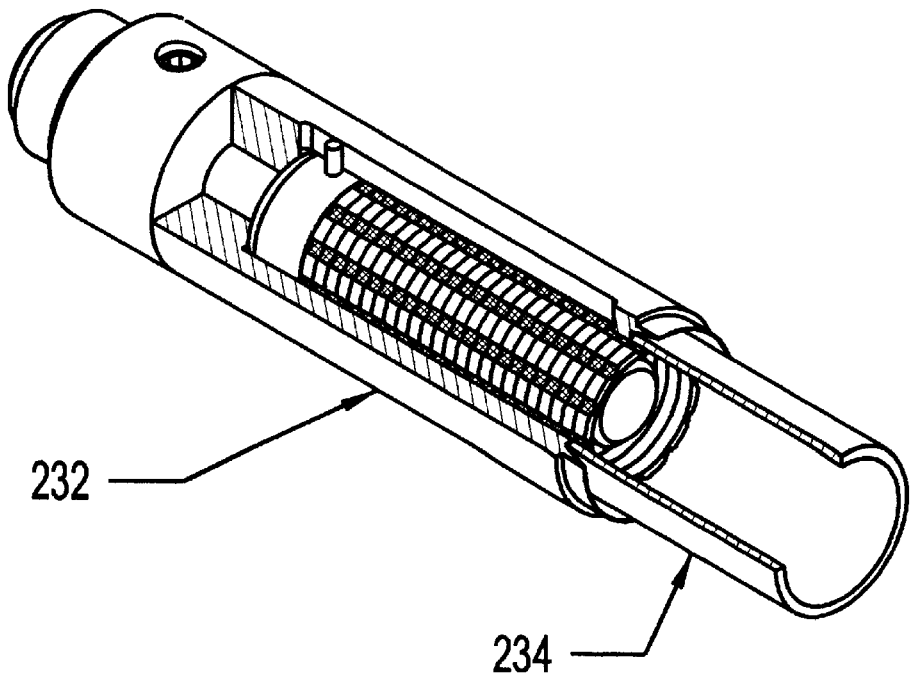
Figure 23C:
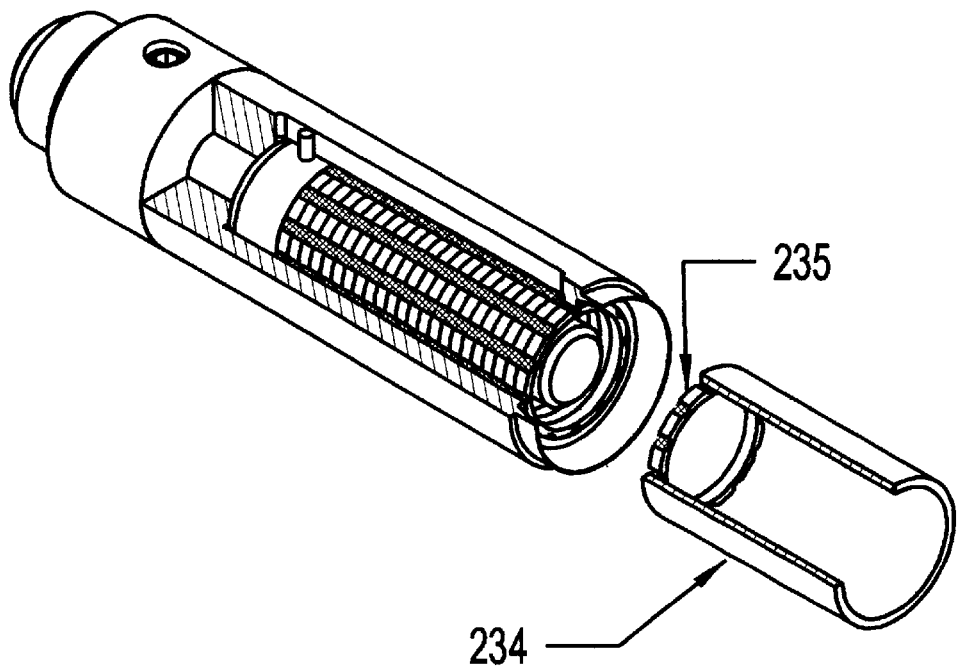

The dispenser used herein was that shown in FIG. 19. FIG. 23 shows how this dispenser was actually used to insert a solder preform into a female pipe fitting. First, the knob (231) of dispenser (232) was moved so that the solder preforms (233) would advance towards the open end of the dispenser. The pipe fitting (234) was then brought to the open end of the dispenser. FIG. 23B shows the female pipe fitting being guided by the specially designed lip of the dispenser until the pipe fitting insertion is comes to a stop. At this point, the pipe fitting (234) can be withdrawn from the dispenser with a solder preform (235) contained therein, as shown in FIG. 23C.

Figure 23D:
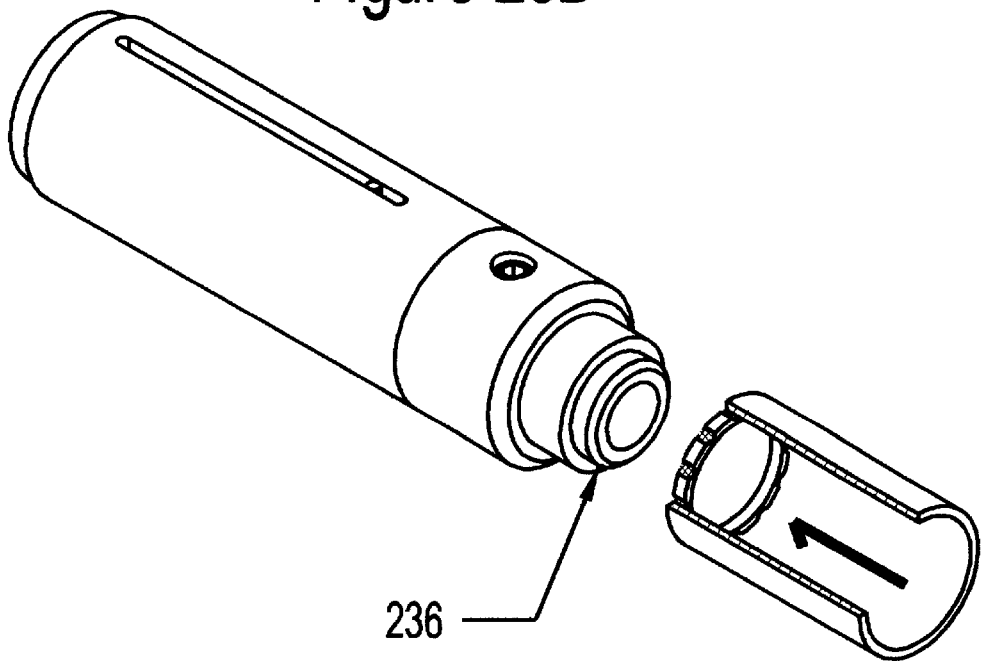
Figure 23E:
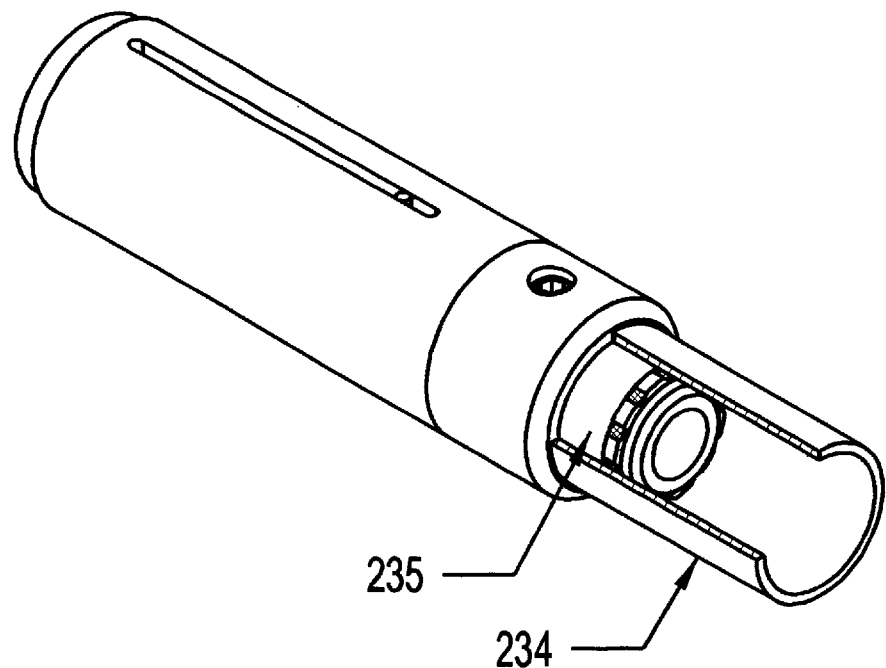

The insertion portion (236) of the dispenser shown in FIG. 23D can then be used to move the solder preform (235) further into the pipe fitting (234), as shown in FIG. 23E.

Figure 23F:
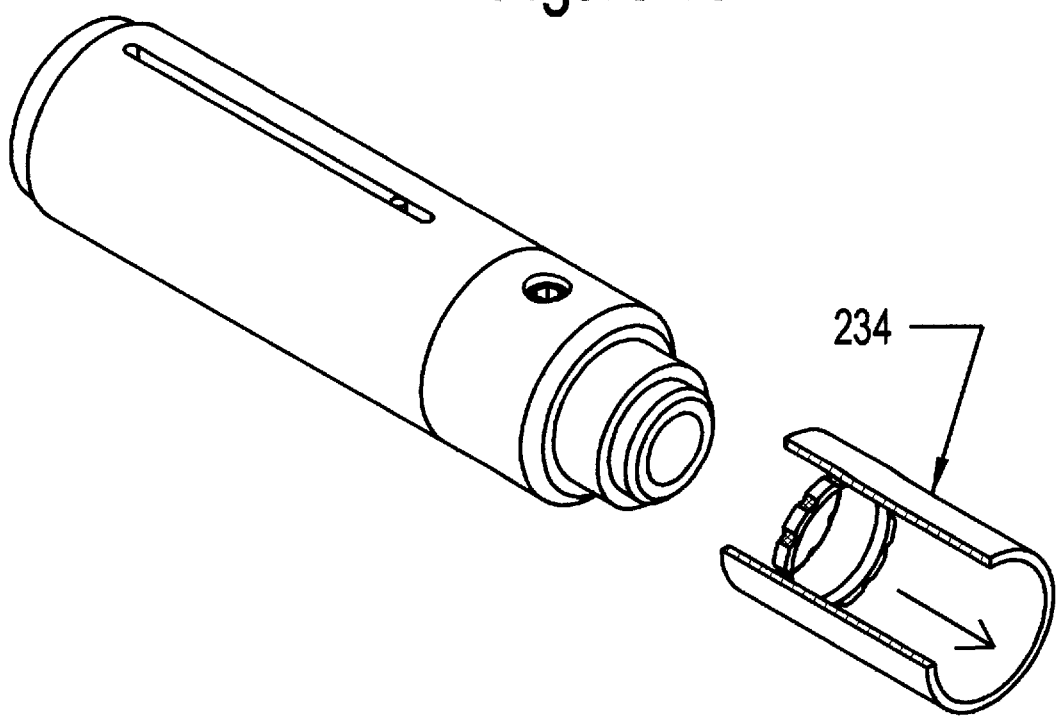

With the solder preform is now properly seated in the pipe fitting, the pipe fitting can be removed from the dispensers (FIG. 23F).

With a solder preform contained therein, the pipe fitting is now ready to be mated with the desired, properly prepared, male pipe end. From this point forward, the piping system and solder preform created using this dispenser-installed solder preform were evaluated as described in Example 1 above.

What is claimed is:

1. A dispenser containing a plurality of stacked solder preforms for use in inserting the solder preforms into a tubular member, the dispenser comprising a cylindrical magazine for storing stacked solder performs and stacked solder preforms advancable through the cylindrical magazine sequentially to and through an open end of the cylindrical magazine, the dispenser having a lip at the open end of the magazine with a tapered inner surface to align a tubular member with a preform located at the open end of the magazine for insertion of a preform into the tubular member.

2. The dispenser of claim 1 wherein a step is located adjacent to the tapered lip, the step providing means in abutment with an end of a tubular member as a solder preform in inserted into the tubular member.

3. The dispenser of claim 1 wherein the solder preforms are press fit, over at least a portion, in the cylindrical magazine.

4. The dispenser of claim 1 wherein the lip comprises a plurality of tapered tabs, adjacent tabs being separated by slots.

5. The dispenser of claim 1 wherein a projection located on the closed end of the cylindrical magazine has an outer dimension greater than an inner dimension of a preform, so that the projection can be employed to further insert a solder preform into the tubular member.

6. The dispenser of claim 1 wherein the preforms comprise rings.

7. The dispenser of claim 6 wherein the preform rings have an outer diameter substantially equal to an inner diameter of a standard pipe fitting and the lip has a minimum inner diameter substantially equal to an outer diameter of the same standard pipe fitting.

8. The dispenser of claim 1 wherein each solder preform in the dispenser has solder flux located on the exterior of the preform.

9. The dispenser of claim 1 wherein the solder flux is located in grooves on the exterior thereof, the grooves extending parallel to an axis of revolution of the cylindrical magazine.

10. The dispenser of claim 1 wherein the preforms and the cylindrical magazine are each right circular cylinders.

11. A dispenser containing a plurality of stacked solder preforms for use in inserting the solder preforms into a tubular member, the dispenser comprising a cylindrical magazine for storing stacked solder preforms and solder preforms movable through the cylindrical magazine sequentially to and through an open end of the cylindrical magazine for insertion into the tubular member, each of the preforms having solder flux disposed on the exterior of the preform, the cylindrical magazine comprising means for preventing a user from coming into contact with the solder flux.

* * * * *